May 19, 1942.                J. A. HANLEY                2,283,551
                    VIBRATORY ELECTRIC MOTOR APPARATUS
                           Filed June 19, 1937
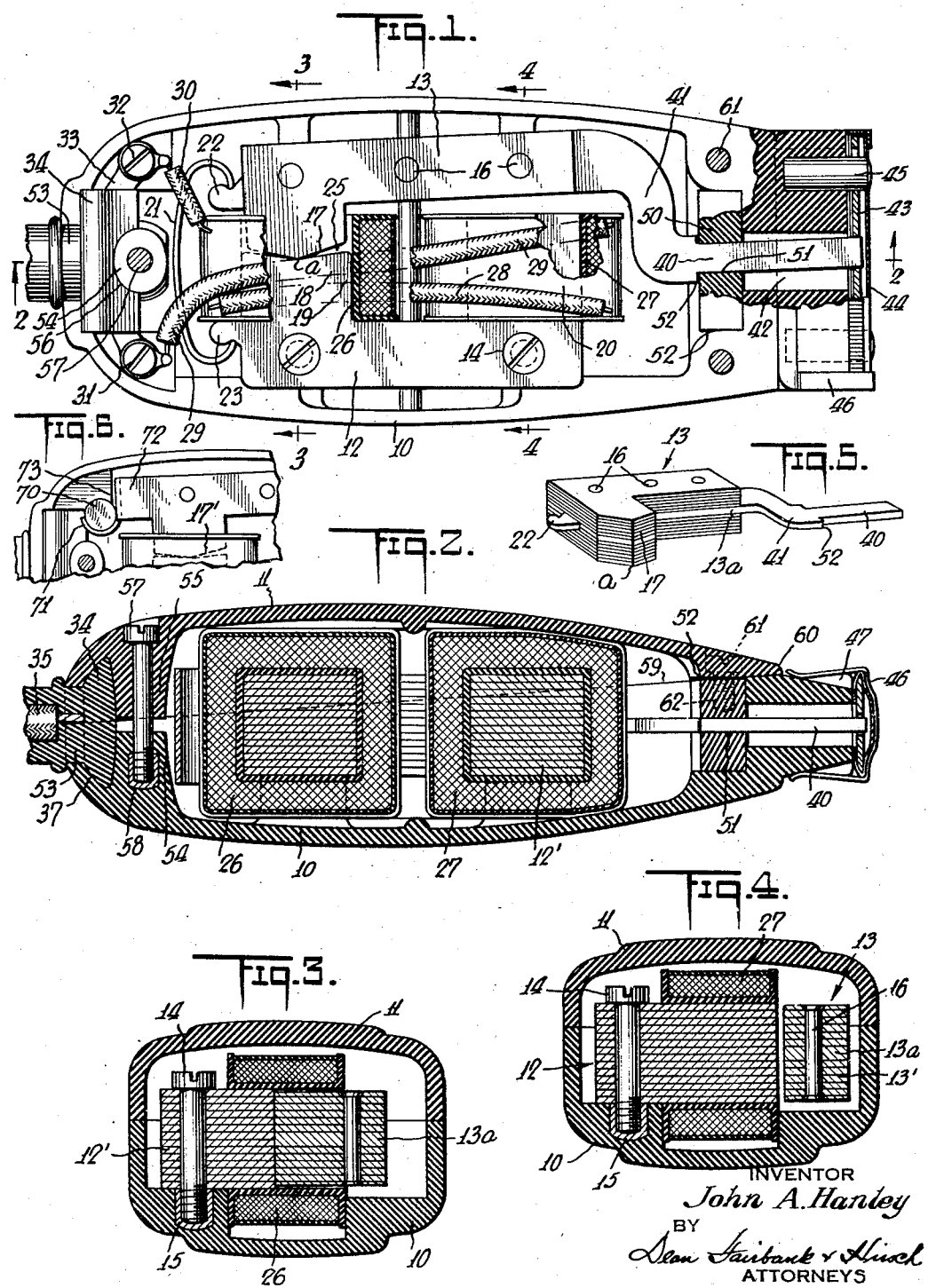
INVENTOR
John A. Hanley Patented May 19, 1942

2,283,551

UNITED STATES PATENT OFFICE 2,283,551

VIBRATORY ELECTRIC MOTOR APPARATUS

John A. Hanley, Noroton, Conn., assignor to Gillette Safety Razor Company, Boston, Mass., a corporation of Delaware Application June 19, 1937, Serial No. 149,055

12 Claims. (Cl. 172—126)

While the present invention is shown applied to an electric shaver, it is applicable also to a variety of other generally analogous apparatus, such as hair clippers, massaging devices and the like, and the vibratory motor incorporated therein is of general utility in other applications.

Among the objects of the invention are to provide an encased electric motor structure of low cost, suitable for a device of the above type which shall evolve high power for small bulk and shall have a minimum number of rugged parts correlated without resort to pivot screws or pins that are apt to come loose or out of alignment and which can accordingly be assembled easily and economically.

Another object is to provide a device of the above type, which in addition to the primary cutting action in the shaving embodiment, inherently performs a vigorous vibrating or massaging action that promotes the shearing, shaving or clipping action.

In the accompanying drawing in which is shown one of various possible embodiments of the several features of the invention, Fig. 1 is a plan view of the device with the cover removed and parts shown in section, better to reveal the details of construction;

Fig. 2 is a view in longitudinal section taken on line 2—2 of Fig. 1,

Figs. 3 and 4 are views in transverse section taken respectively on lines 3—3 and 4—4 of Fig. 1, Fig. 5 is a perspective view of the armature unit, and Fig. 6 is a fragment of a view similar to Fig. 1 showing a modification.

Referring now to the drawing there is shown an insulating casing involving a base 10 and cover 11 serving as the handle for the electrically driven shaver or other tool and housing the vibratory electric motor. The motor comprises a generally rectangular open soft iron magnetic frame including a fixed field structure 12 and a movable armature 13. The field structure is made up of a stack of generally U-shaped laminations 12' secured to the floor of the casing by a pair of screws 14 threaded into metal nuts or sockets 15 preferably molded into the base of the casing. The armature 13 is made up of a stack of generally L-shaped laminations 13' held together by rivets 16. The armature is not affirmatively secured with respect to the field structure but has a rocking, preferably a thrust bearing engagement at the toe end of the L with the end of one leg of the U-shaped field structure. In a preferred construction of such thrust bearing the toe of the L-shaped armature has an obtuse dihedral angular extension or peak 17 lodged in an obtuse dihedral angular depression 18 of wider angularity, in the end of the field leg 19. The outer leg 20 of the field structures is longer than leg 19 so that the length of the armature which extends transversely thereacross is in contiguity thereto.

A spring, preferably an elliptic leaf spring 21 is hooked at its extremities to anchoring lugs 22 and 23 that are stamped integrally with the shorter legs of the laminations making up the field and armature structures. The spring 21 draws the armature against the field structure and maintains the left oblique walls of the respective trough and peak as shown in Fig. 1, in face-to-face engagement, with the apex a of said peak in the angle of the trough 18, and a small angular gap 25 exists between the corresponding right sides of the dihedral angles formed therebetween. Spring 21 is free from engagement with the motor and casing, except at its anchored extremities, so that it may vibrate without obstruction in motor operation.

Electromagnet spools 26 and 27 encircle the respective legs 19 and 20 of the field structure and are lodged against movement in corresponding depressions in the floor of the casing as appears best from Figs. 3 and 4. The spools are connected in series by conduit 28, and the conduit leads 29 and 30 therefrom are attached to terminal screws 31 and 32 respectively, which have electrical and mechanical contact with metal stampings 33 that protrude through the molded flexible rubber bushing 34 within which they are connected to the conductor elements of the cord set 35. The bushing 34 is rectangular in form and fits in corresponding rectangular recesses 37 respectively in the casing 10 and the cover 11 thereof.

An intermediate lamination 13a of the armature, as best shown in Fig. 5 preferably of greater thickness than the other laminations is elongated and conformed to extend about the spool 27 as at 41 to serve as the tool operating arm 40 which protrudes centrally outward through a port 42 in the forward end of the casing for coaction, in the electric shaver embodiment, with a movable blade 43 to be oscillated thereby for performing the shearing action. Blade 43 coacts with a fixed blade 44 which may be mounted on studs 45 molded into the end of the casing. An open rectangular metal clamp structure 46 engages the ends of the blade assembly and snaps over lateral inwardly inclined lugs 47 molded as part of the casing. The structure of the cutter illustratively shown, need not be more fully described as it is not per se, the subject of the present application but is more fully described and claimed in various prior patents issued to me, including Patent No. 2,246,586 granted June 24, 1941, on a copending application Serial No. 303,597 filed November 9, 1939.

A cushion 50 comprising a generally rectangular block of resilient rubber is centrally perforated at 51 to encircle the extension arm 40 of the armature and is lodged against corresponding shoulders in the casing and its cover, the latter compressing said resilient rubber block snugly to embrace the operating arm 40. Shoulders 52 on the operating arm 40 engage rubber block 50 and help to keep it in place.

The cover 11 at the rear end is as deep as the casing 10, the rear walls of said elements affording complementary notches snugly to embrace the neck 53 of the resilient bushing 34. The casing 10 and the cover 11 also have integral studs 54 and 55 respectively lodged in corresponding grooves 56 in bushing 34. Studs 54 and 55 are perforated to accommodate a fastening screw 57 threaded into a socket or nut 58 molded into the base of stud 54. The lateral casing walls 59 extend obliquely upward from the rear and the lateral walls of the cover extend correspondingly obliquely to narrow to a relatively sharp forward edge 60 to the rear of the tool mounting end of the casing. A pair of shorter cover fastening screws 61 laterally of the cushion 50 are threaded into corresponding sockets or nuts 62 molded into the casing.

In operation, alternations in the magnetization of the soft iron frame 12, 13 will occur with a frequency corresponding to that of the source of current. As the magnetization reaches a maximum the armature 13 will be attracted by rocking about the apex of peak 17 toward the right, against the resistance of spring 21 as well as against the resistance of resilient cushion 50, both of which stressed elements conjointly help promptly to return the armature to the position shown in Fig. 1 upon demagnetization in the course of each reversal of current phase. Thus on a 60 cycle circuit the motor armature will perform 7200 oscillations per minute and the shearing plate 43 or corresponding tool element will be oscillated at that rate.

The cushion 50 performs the combined functions of preventing contact between the operating arm 40 with the casing, of preventing complete closure of gap 25, and of imposing a resilient load on the armature, thereby storing energy which acts to bias the armature to return after each magnetic impulse. The spring 21 acts conjointly with the cushion 50 in imposing a resilient load, and releasing its stored energy for armature return, and in addition it keeps the apex a of the armature against the end of the field structure throughout operation and thus prevents the possibility of chattering or clattering at the magnetic thrust bearing and assures smoothness of the rocking action set forth. The motor therefore operates with a sustained constant pitch corresponding to the frequency of the operating current.

It will be seen that the armature is of floating character, since at all stages of its rocking movement, it engages and is resisted both by the spring 21 and the cushion 50. There is no lost motion and the impact which would result were there any lost motion, is avoided. The bearing 17—18 constitutes a magnetic pivot, which affords at all times a continuous iron circuit for the magnetic flux, for which reason magnetic losses are minimized and there is a minimum of mechanical friction.

The operation of the motor is such that the entire casing is caused to vibrate forcefully in the hand, and thereby, in addition to the cutting action by the sliding of the movable blade 43 relative to the fixed blade 44, the entire unit oscillates vigorously at frequency corresponding to that of the motor actuating current. A mechanical massaging action is accordingly imparted to the skin while the shaving proceeds, with the beneficial results commonly attributed to such action. By this operation discomfort to the skin in shaving is avoided as the hair is more readily caused to enter between the teeth of the cutter, and the ejection of the clippings is also facilitated by such vibration. Therefore the ease of shaving is enhanced as compared to a corresponding instrument operated from a rotary armature and devoid of the vibratory action set forth.

The construction is seen to be of extreme simplicity, with no rotary bearings and with the elimination of the need for precision of manufacture and adjustment that such bearings require. There is also the elimination of all circuit interrupters and associated arc quenchers and the disturbing effect of said interrupters on radio receivers is obviated. The motor being self-starting, the starting wheel or roller of conventional electric shavers is also eliminated. The few rugged parts making up the assembly are readily put together without the need for skilled workmanship.

In the embodiment of Fig. 6, the leaf spring 21 is replaced by a cushion comprising a soft rubber block 70 carried in a cradle 71 affixed to an extension 72 of the armature beyond the thrust bearing element 17' thereof. Rubber block 70 reacts against a ledge 73 in the casing 10. Accordingly, in operation, the cushion 70 is compressed and stores energy as the armature when attracted by the field structure rocks clockwise about pivot 17'. The stressed rubber block 70 upon demagnetization of the magnetic frame therefor helps to return the armature to position corresponding to that of Fig. 1, and performs all the other functions of spring 21.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:

1. A vibratory electric motor of the character described, comprising a magnetic frame including a fixed field structure and an armature with an associated electromagnet coil, the magnetic end face of said armature at one end thereof having thrust bearing engagement with the magnetic end face of said field structure, said bearing comprising a depression in the end face of one of said elements of wider angularity and a projection on the end face of the other element of narrower angularity to permit rocking movement of the armature relative to the field structure, said armature and field structure having spring anchors adjacent said thrust bearing and a leaf spring connecting said anchors and resisting the approach of said armature to said field structure.

2. An electric vibratory motor of the class described, comprising an open generally rectangular magnetic frame, an electromagnet coil thereabout, said frame including a field structure and an armature in thrust bearing engagement at one end thereof, the thrust bearing construction comprising a magnetic dihedral trough in the end face of one of said elements of somewhat greater angularity, and a magnetic dihedral peak in the end face of the other of lesser angularity, and a leaf spring anchored adjacent said thrust bearing to the field structure and armature and serving to maintain said thrust bearing engagement and opposing the action of the electromagnet coil.

3. The combination recited in claim 2 in which integral lugs protruding from the ends of the field structure and armature serve as spring anchors, and the spring is of generally elliptical form with its ends bent about said lugs.

4. An electric vibratory motor comprising a field structure, an armature having a thrust bearing engagement with said field structure by direct rocking contact therewith, an electromagnet coil associated with said structure and resilient means near opposite ends of the armature between which said thrust bearing is located, each of said resilient means at all times engaging the armature and resisting the movement thereof for a floating action.

5. In apparatus of the character described, a handle casing, a magnetic frame therein with an associated electromagnet coil and comprising a field structure and an armature, and extending generally longitudinally of the casing, said armature being pivoted near the rear end thereof with respect to the field structure and having a unitary operating arm protruding through the forward end of said casing constituting an extension of said armature and adapted to support a tool and a compressible block through which said arm extends, said block being clamped by the casing wall and serving resiliently to cushion the lateral movement of said arm under motor operation.

6. In apparatus of the character described, a handle casing, a magnet therein with an associated electromagnet coil, and comprising a field structure and an armature and extending generally longitudinally of the casing, said armature having a unitary operating arm protruding through the forward end of said casing and adapted to support a tool, said armature having a rocking engagement with the field structure at the end thereof opposite said operating arm, spring means connecting said armature to said field structure adjacent said region of rocking engagement and tending to tilt the armature away from the field structure, and a compressible cushion means engaging said operating arm and retained by the casing wall.

7. The combination recited in claim 6 in which the cushion means is a soft rubber block perforated to accommodate the operating arm, compressed by the casing cover, and engaged at one face by lugs on the operating arm.

8. In apparatus of the character described an insulating casing, a laminated generally open rectangular magnetic frame therein, with an electromagnet coil encircling a part thereof, said frame including a generally U-shaped field structure secured to the casing, and a generally L-shaped armature having thrust bearing engagement with the field structure at the inner end thereof, said thrust bearing comprising an obtuse trough in the end of the field structure and a somewhat less obtuse peak on the end of the armature, a spring anchored at its ends to the side walls of the field structure and armature respectively and tending to tilt the armature away from the field structure, a lamination of the armature extending therebeyond through the forward end of the casing and adapted to mount a tool.

9. A vibratory electric motor comprising a field structure, an armature having a thrust bearing engagement with said field structure by direct rocking contact therewith, an electromagnet coil associated with said structure and resilient means comprising soft rubber cushions near opposite ends of the armature, each interposed in the path of and resisting the rocking movement of the armature.

10. In apparatus of the character described, a handle casing, a vibratory electric motor therein, comprising a fixed laminated magnetic field structure, a movable laminated coacting armature structure, the ends of the respective laminations of field and armature structure being in direct pivot thrust engagement, resilient means maintaining said engagement, said means comprising a spring engaging the extremities of the field and armature structure respectively and urging the armature about its pivot away from the field structure, the armature having rigid therewith a tool operating arm protruding from the casing.

11. The combination recited in claim 10 in which the tool operating arm constitutes a unitary extension of one of the laminations making up the armature structure.

12. In apparatus of the character described, a handle casing, a vibratory electric motor therein, comprising a generally U-shaped laminated field structure having the end of one leg notched as a pivot thrust bearing, an electromagnetic coil about the other leg of said field structure, a laminated L-shaped armature structure, the ends of the laminations thereof defining a ridge bearing against said thrust bearing structure, resilient means adjacent said thrust bearing structure and urging the armature to open position, said armature having a tool operating lever unitary therewith protruding through one end of the casing.

JOHN A. HANLEY.